(12) United States Patent
Lansberry

(10) Patent No.: US 7,135,217 B2
(45) Date of Patent: Nov. 14, 2006

(54) MULTIPLE LAYER GLASS PANELS WITH PATTERNED LIGHT TRANSMISSION

(75) Inventor: Angela Marie Lansberry, Feeding Hills, MA (US)

(73) Assignee: Solutia Incorporated, St. Louis, MO (US)

(*) Notice: Subject to any disclaimer, the term of this patent is extended or adjusted under 35 U.S.C. 154(b) by 180 days.

(21) Appl. No.: 10/753,485

(22) Filed: Jan. 9, 2004

(65) Prior Publication Data

US 2005/0153106 A1 Jul. 14, 2005

(51) Int. Cl.
*B32B 17/10* (2006.01)
*B32B 27/08* (2006.01)
*B32B 27/18* (2006.01)
*B32B 27/30* (2006.01)
*B32B 27/36* (2006.01)

(52) U.S. Cl. .................. 428/195.1; 428/201; 428/203; 428/206; 428/207; 428/343; 428/355 R; 428/355 EN; 428/426; 428/441; 428/442; 428/480; 428/483; 428/522

(58) Field of Classification Search .................. None
See application file for complete search history.

(56) References Cited

U.S. PATENT DOCUMENTS

| 4,465,736 A | * | 8/1984 | Nishihara et al. ........... 428/332 |
| 4,600,627 A | | 7/1986 | Honda |
| 4,824,722 A | * | 4/1989 | Jarrett ........................ 428/430 |
| 4,968,553 A | * | 11/1990 | Cesar ......................... 428/203 |
| 4,976,805 A | * | 12/1990 | Ishii et al. .................. 156/100 |
| 5,271,973 A | * | 12/1993 | Huether ........................ 428/34 |
| 5,340,654 A | * | 8/1994 | Ueda et al. .................. 427/437 |
| 5,364,479 A | * | 11/1994 | Boattini et al. ............. 156/100 |
| 5,400,848 A | * | 3/1995 | Gainer ........................ 160/238 |
| 5,427,842 A | * | 6/1995 | Bland et al. ................. 428/213 |
| 5,593,786 A | | 1/1997 | Parker |
| 5,834,124 A | * | 11/1998 | Pease et al. ................. 428/430 |
| 6,156,411 A | * | 12/2000 | Jennings .................. 428/195.1 |
| 6,753,056 B1 | * | 6/2004 | Mizumoto .................. 428/41.8 |
| 2002/0061395 A1 | * | 5/2002 | Moran et al. ................ 428/215 |
| 2002/0142155 A1 | * | 10/2002 | Steinberg .................... 428/343 |
| 2003/0054160 A1 | * | 3/2003 | Fisher et al. ................ 428/328 |
| 2003/0161997 A1 | * | 8/2003 | Moran ........................ 428/172 |
| 2003/0162028 A1 | * | 8/2003 | Friedman et al. ........... 428/421 |

FOREIGN PATENT DOCUMENTS

| JP | 52-155617 | * | 12/1977 |
| JP | 63301004 | | 8/1988 |
| JP | 02035401 | | 6/1990 |
| JP | 4-201335 | | 7/1992 |
| JP | 04-201335 | * | 7/1992 |
| JP | 05-104695 | * | 4/1993 |
| JP | 8-157239 | * | 6/1996 |
| JP | 08-157239 | * | 6/1996 |
| JP | 05-104695 | * | 4/1999 |
| WO | WO 83/03800 | * | 11/1983 |

* cited by examiner

*Primary Examiner*—Vivian Chen
(74) *Attorney, Agent, or Firm*—Brenc Law

(57) ABSTRACT

The present invention is in the field of laminated glass panels comprising multiple layers of polymer sheets with patterned light transmission qualities and methods of producing and using the same. More specifically, the present invention is in the field of laminated glass panels featuring novel patterns formed by two printed patterns supported on one or more layers of polymeric sheet material, such as polyethylene terephthalate.

48 Claims, 5 Drawing Sheets

least one layer of colored poly(vinyl butyral), can appear different in color from one side of the laminate to the other.

Further improved compositions and methods are needed to enhance the characteristics of laminated glass panels, and specifically laminated glass panels comprising poly(vinyl butyral) layers and polyethylene terephthalate layers, so as to impart desirable optical patterns and light transmission and reflectance qualities on the finished glass panel.

MULTIPLE LAYER GLASS PANELS WITH PATTERNED LIGHT TRANSMISSION

FIELD OF THE INVENTION

The present invention is in the field of laminated glass panels comprising multiple layers of polymer sheets with patterned light transmission qualities and methods of producing and using the same. More specifically, the present invention is in the field of laminated glass panels featuring novel patterns formed by two printed patterns supported on one or more layers of polymeric sheet material, such as polyethylene terephthalate.

BACKGROUND

Poly(vinyl butyral) (PVB) is commonly used in the manufacture of polymer sheets that can be used as interlayers in light-transmitting laminates such as safety glass or polymeric laminates. Safety glass typically refers to a transparent laminate comprising a poly(vinyl butyral) sheet disposed between two sheets of glass. Safety glass often is used to provide a transparent barrier in architectural and automotive openings. Its main function is to absorb energy, such as that caused by a blow from an object, without allowing penetration through the opening or the dispersion of shards of glass, thus minimizing damage or injury to the objects or persons within an enclosed area. Safety glass also can be used to provide other beneficial effects, such as to attenuate acoustic noise, reduce UV and/or IR light transmission, and/or enhance the appearance and aesthetic appeal of window openings.

Laminated safety glass can also include a layer of a polymer such as polyethylene terephthalate (PET), which can be used to impart various optical qualities to the final laminated glass product. For example, a polyethylene terephthalate layer can be used to support a printed image or can be treated with agents that selectively absorb certain wavelengths of light, thereby altering the visual appearance or final light transmission characteristics of the finished glass panel.

In many architectural applications it is desirable to use safety glass that not only has the proper physical performance characteristics for the chosen application, but also has light transmission characteristic that are unique, decorative, and/or particularly suitable to the end use of the product. For example, it will often be desirable to limit visible light transmission through laminated safety glass in order to provide a degree of visual separation between two adjacent areas or to modify the visual appearance of a laminated glass panel so as to create a desirable appearance. It may be desirable, for example, to utilize a laminated glass panel featuring patterns, colors, or visual effects that are different or the same when viewed from either side of the panel and that can provide varying levels of light transmission.

There is significant commercial interest in the fabrication of glass laminates with encapsulated printed images having novel patterns, colors, and light transmission qualities for use in architectural and automotive applications. A current state-of-the-art glass laminate product consists of an interlayer composite disposed between two glass sheets, wherein the interlayer composite comprises three layers. In this construct, a layer of polyethylene terephthalate that is printed on one side with a pattern is disposed between two layers of poly(vinyl butyral). Such interlayer composites effectively can be utilized to achieve glass laminates having a single pattern of light transmission, and, with the use of at

SUMMARY OF THE INVENTION

Now, according to the present invention, a multiple layer interlayer composite has been developed that can be used to achieve a novel laminated glass product featuring novel patterns within the laminate, select coloration from one side of the laminate to the other, and layers of color within the laminate. Resulting laminates can appear very different in transmission than in reflection. Layering of colors and arrangement of patterns can produce novel multilayer composite interlayers that can be used for a wide variety of laminated glass applications.

The present invention includes an interlayer composite, comprising: a first polymeric support film layer having a first pattern printed thereon; a first adhesive polymer layer; and, a second polymeric support film layer having a second pattern printed thereon, wherein said first adhesive polymer layer is disposed between and in contact with said first polymeric support film layer and said second polymeric support film layer.

The present invention includes an interlayer composite, comprising: a polymeric support film layer having a first pattern printed on one side and a second pattern printed on the other side; a first adhesive polymer layer; and, a second adhesive polymer layer, wherein said polymeric support film is disposed between and in contact with said first adhesive polymer layer and said second adhesive polymer layer.

The present invention includes a multiple layer glass panel, comprising: a first layer comprising polyethylene terephthalate, wherein said first layer transmits visible light in a pattern; a second layer comprising poly(vinyl butyral), wherein said second layer is disposed in contact with said first layer; and, a third layer comprising polyethylene terephthalate, wherein said third layer transmits visible light in a pattern and is disposed in contact with said second layer.

The present invention includes a method of altering the light transmission between two areas, comprising: providing a multiple layer glass panel between said two areas, wherein said glass panel comprises: a first layer comprising polyethylene terephthalate, wherein said first layer transmits visible light in a pattern; a second layer comprising poly(vinyl butyral), wherein said second layer is disposed in contact with said first layer; and, a third layer comprising polyethylene terephthalate, wherein said third layer transmits visible light in a pattern and is disposed in contact with said second layer; and, transmitting light through said glass panel.

The present invention includes a multiple layer glass panel, comprising: a first layer comprising polyethylene terephthalate, wherein said first layer transmits visible light in a pattern; a second layer comprising poly(vinyl butyral), wherein said second layer is disposed in contact with said first layer; a third layer comprising polyethylene terephthalate, wherein said third layer transmits visible light in a pattern and is disposed in contact with said second layer; a fourth layer comprising poly(vinyl butyral), wherein said fourth layer is disposed in contact with said first layer; a fifth layer comprising poly(vinyl butyral), wherein said fifth layer is disposed in contact with said third layer; a sixth layer of glass, wherein said sixth layer is disposed in contact with said fourth layer; and, a seventh layer of glass, wherein said seventh layer is disposed in contact with said fifth layer.

DETAILED DESCRIPTION

As described in detail herein, the present invention involves laminated glass constructs comprising a multiple layer composite interlayer that utilizes two or more patterns formed on polymeric films to create a finished glass product that provides for novel patterns of color and light transmission and reflection.

Figure 1:
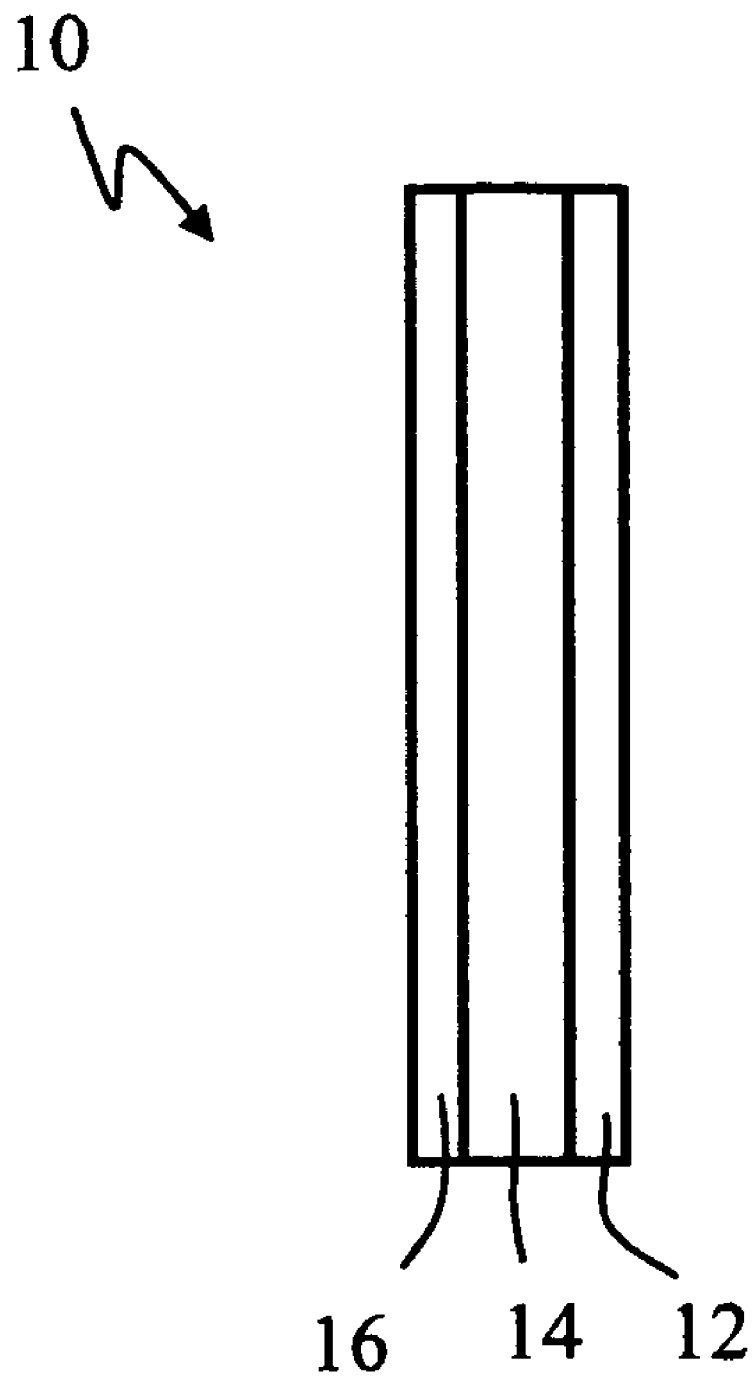
FIG. 1 is a schematic diagram of a cross-sectional view of one embodiment of the present invention.

As shown in FIG. 1 generally at 10, embodiments of the present invention include a multiple layer composite interlayer for a laminated glass panel comprising a first layer 12, a second layer 14 disposed in contact with the first layer 12, and a third layer 16 disposed in contact with the second layer 14, wherein the first layer 12 and the third layer 16 each transmit visible light in a pattern and the second layer 14 serves to bind the first layer 12 and the third layer 16 together. Optionally, as will be described in more detail below, the second layer 14 can further comprise an agent that imparts color to the layer and/or selectively absorbs light in the visible spectrum.

As will be detailed below, the second layer 14 can comprise any appropriate adhesive layer that is compatible with the first layer 12 and the third layer 16 for use in laminated glass panels. Adhesive layers that can be utilized with the present invention include polyvinyl butyral, polyurethane, ethylene vinyl acetate copolymer, plasticized polyvinyl chloride as well as other elastomeric polymers with energy absorbing properties and surface chemistry to provide adequate adhesion to glass and the polymeric support film and polymeric film layers. In various embodiments, the adhesive layer of the present invention is plasticized poly(vinyl butyral).

The first layer 12 and the third layer 16 can comprise any suitable polymeric support film that can support a pattern while also conforming to the optical specifications required in the finished glass product. For example, polyethylene terephthalate can be used for either or both of the first layer 12 and the third layer 16. In these embodiments, a pattern can be printed onto the polymeric support film, which can be coated with a polymer film to improve its ink transfer characteristics.

In various embodiments, the thickness of the polymeric support film can be, for example, 25 to 250 micrometers. The polymeric support film of the present invention can have properties that maintain its integrity during handling and deposition of the pattern onto its surface, as well as during subsequent bonding and laminating steps. Furthermore, the polymeric support film can have properties sufficient to be an integral part of the final multiple layer glass product. To satisfy such performance requirements, the polymeric support film can be optically transparent (that is, objects adjacent one side of the layer can be comfortably seen by the eye of a particular observer looking through the layer from the other side). In various embodiments, the polymeric support film has a tensile modulus that is at least equal to that of the adhesive layers. In various embodiments, the polymeric support film has a tensile modulus that is significantly greater than that of the adhesive layers.

Among thermoplastic materials having the desired physical properties for use as the polymeric support film are nylons, polyurethanes, polyacrylates, polyesters, polycarbonates, cellulose acetates and triacetates, vinyl chloride polymers and copolymers and the like. In various embodiments, the polymeric support film is polyethylene terephthalate. In various embodiments, the polyethylene terephthalate is biaxially stretched to improve strength, and is also heat stabilized to provide low shrinkage characteristics when subjected to elevated temperatures (that is, less than 2% shrinkage in both directions after 30 minutes exposure at 150° C.). The tensile modulus (at 21–25° C.) of polyethylene terephthalate can be about $10^{10}$ Pa as compared with about $10^7$ Pa for plasticized poly(vinyl butyal) of the type used in safety glass.

Figure 2:
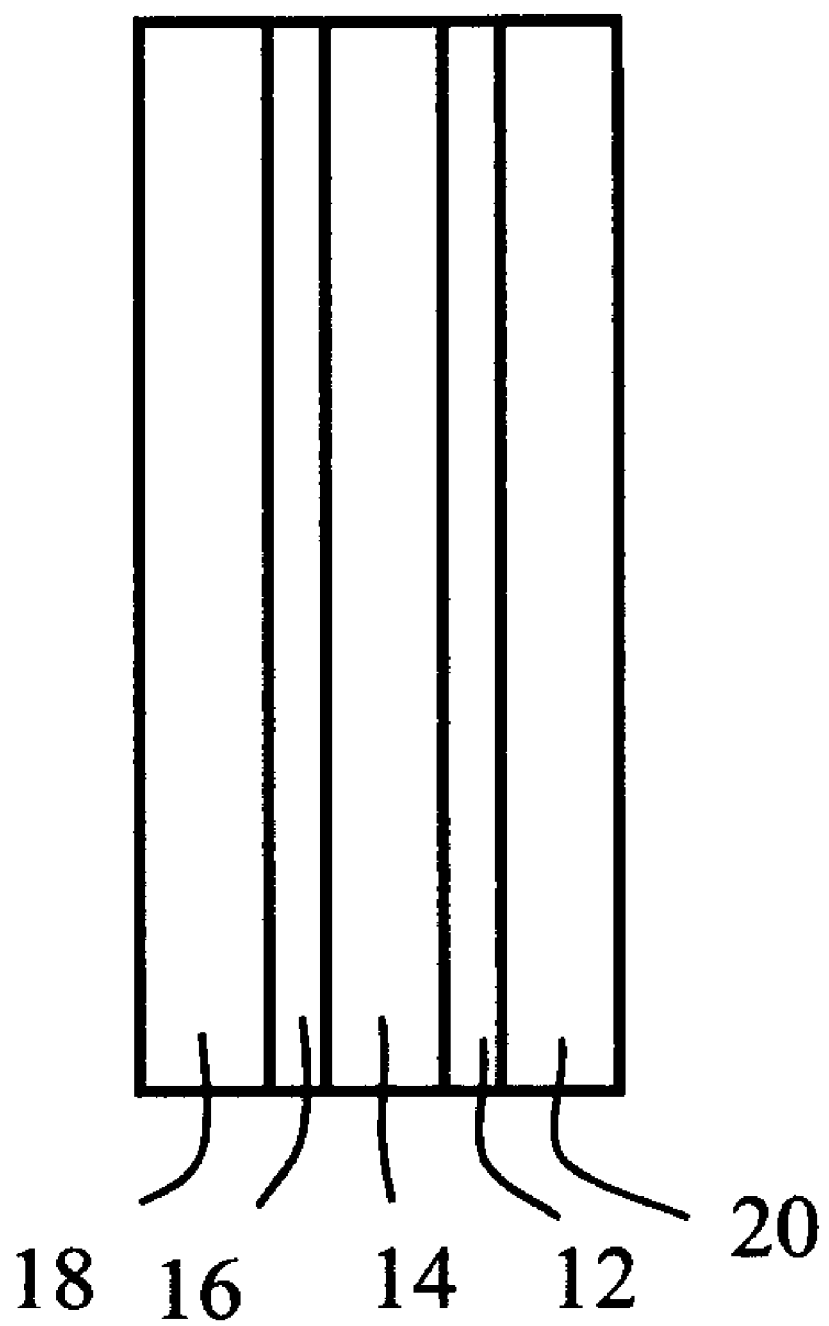
FIG. 2 is a schematic diagram of a cross-sectional view of one embodiment of the present invention.

As shown in FIG. 2, in various embodiments of the present invention, a fourth layer 20 can be disposed in contact with the first layer 12, and a fifth layer 18 can be disposed in contact with the third layer 16. The fourth layer 20 and the fifth layer 18 can be the same material as the second layer 14, for example, poly(vinyl butyral). Further layers can be incorporated into the final multiple layer interlayer composite panel, including further layers of poly(vinyl butyral) or similar polymer layer, for example between the first layer 12 and the second layer 14 or between the second layer 14 and the third layer 16.

The outer surface layers of the combined polymeric support films in contact with the adhesive layers may be appropriately coated and/or treated to enhance adhesion and laminate integrity. Preferred techniques are chemical modification of the outer polymeric support films by flame treatment, chemical oxidation, corona discharge, carbon sputtering, plasma treatment in vacuum or in air, application of an adhesive, or other treatments well known to those of ordinary skill in the art.

Figure 3:
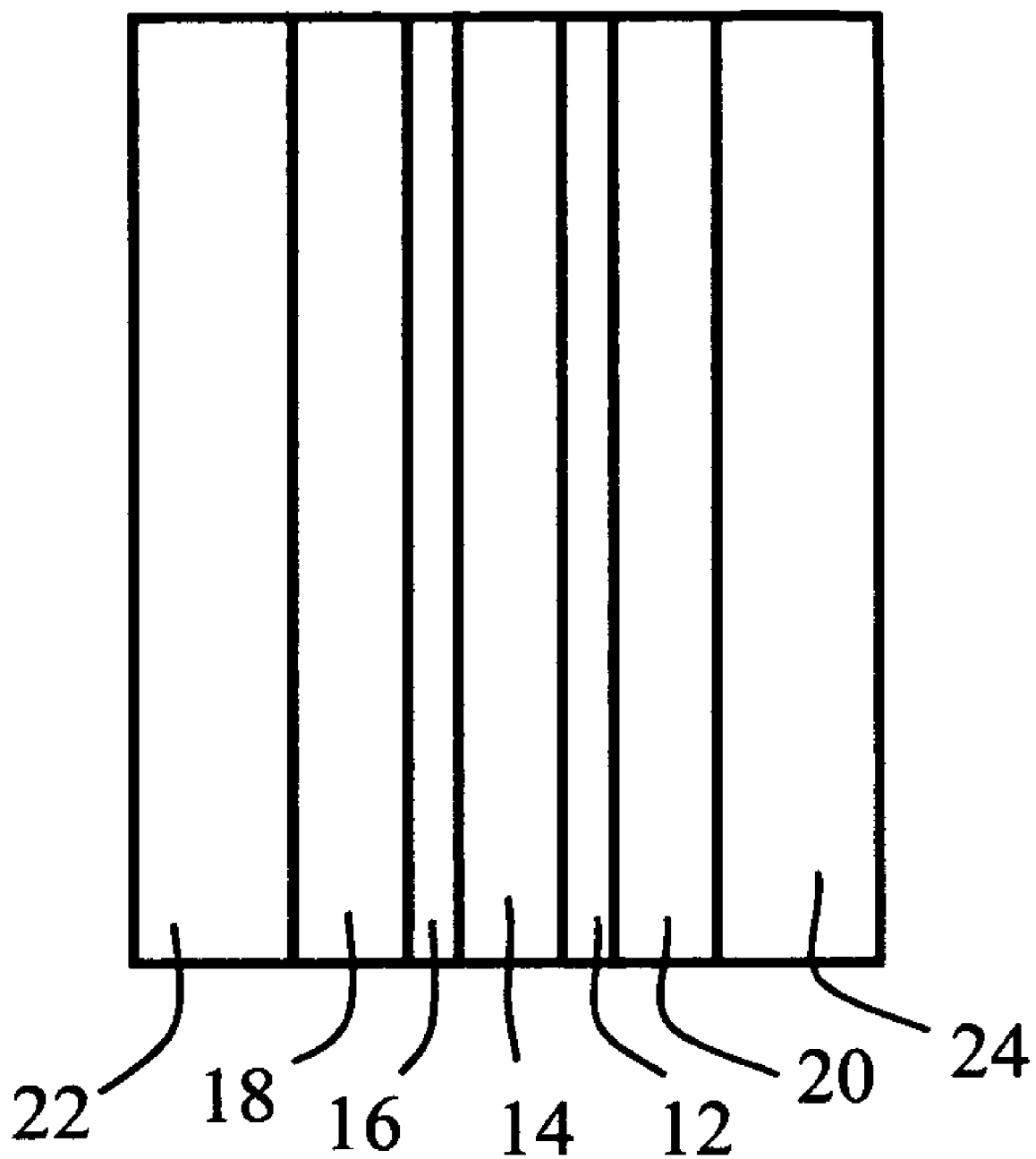
FIG. 3 is a schematic diagram of a cross-sectional view of one embodiment of the present invention.
Figure 4:
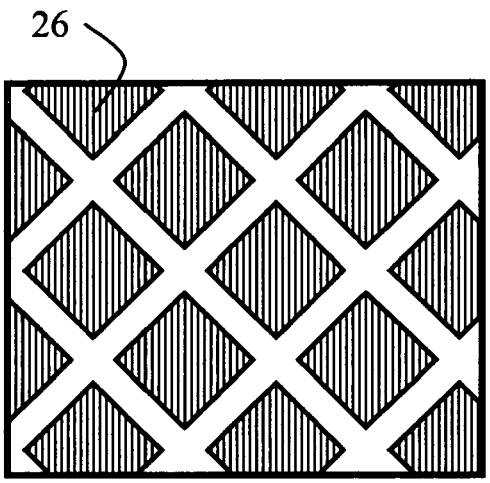
FIGS. 4, 5, 6, and 7 are each schematic representations of patterns that can be used with the present invention.
Figure 5:
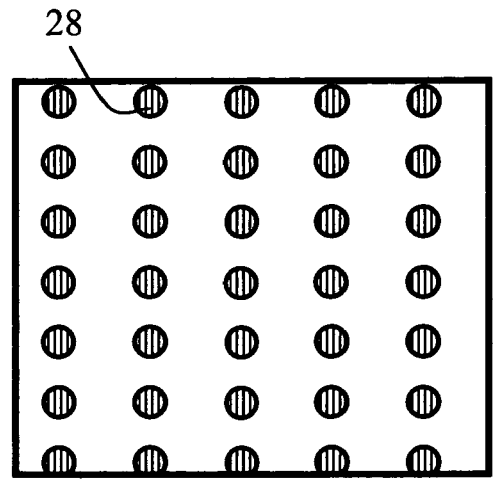
Figure 6:
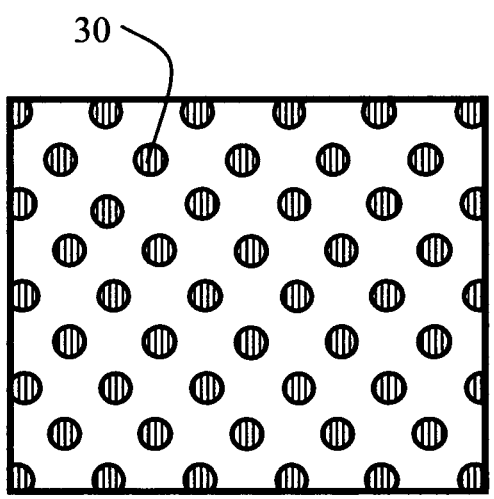
Figure 7:
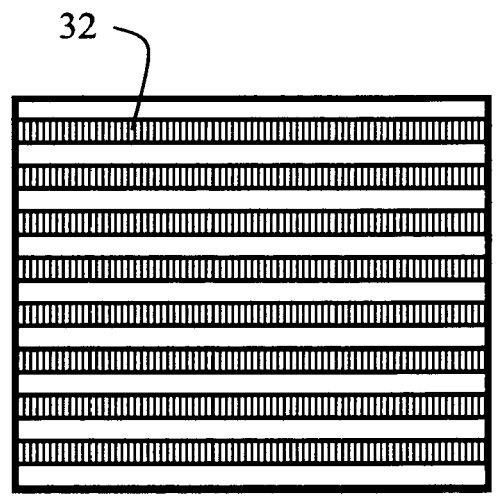

As shown in FIG. 3, in various embodiments of the present invention, a sixth layer 24 of glass can be disposed in contact with the fourth layer 20, and a seventh layer of glass 22 can be disposed in contact with the fifth layer 18. FIG. 3 therefore shows a schematic representation of one embodiment of a multiple layer glass laminate panel in cross section FIGS. 4, 5, 6, and 7 each show a pattern that can be used for either or both of the first layer 12 and the third layer 16. As shown in FIG. 4, a square 26 pattern can be printed on or otherwise incorporated into the layers. FIG. 5 shows one pattern of dots 28. FIG. 6 shows a second pattern of dots 30 that can be used. FIG. 7 shows a pattern of stripes 32, or bars, that can be used. It is, of course, possible to alter any of the exemplified patterns as is desired to affect the final visible light transmission characteristics of the finished glass panel. For example, the squares 26 shown in FIG. 4 can be made smaller or larger, can be rotated about a point in the middle of each square, can be spaced further apart or closer together, or otherwise varied to achieve a desired appearance. Likewise, the dots 28, 30 shown in FIG. 5 and FIG. 6 and the stripes 32 shown in FIG. 7 can be increased or decreased in size, moved closer or further apart, or otherwise be moved to arrive at different configurations, as desired to permit more or less light to pass through the glass panel or achieve a different visual effect. Further, the patterns shown in FIGS. 4, 5, 6, and 7 are exemplary, and virtually any pattern, including any geometric pattern, can be used on either or both of the first layer 12 and the third layer 16.

As shown in FIGS. 1, 2, and 3, the final visual effect imparted to the finished multiple layer glass panel is conferred by a combination of the light transmitting and reflecting characteristics of all of the intervening layers, which can be laminated together in processes described elsewhere herein.

Figure 8:
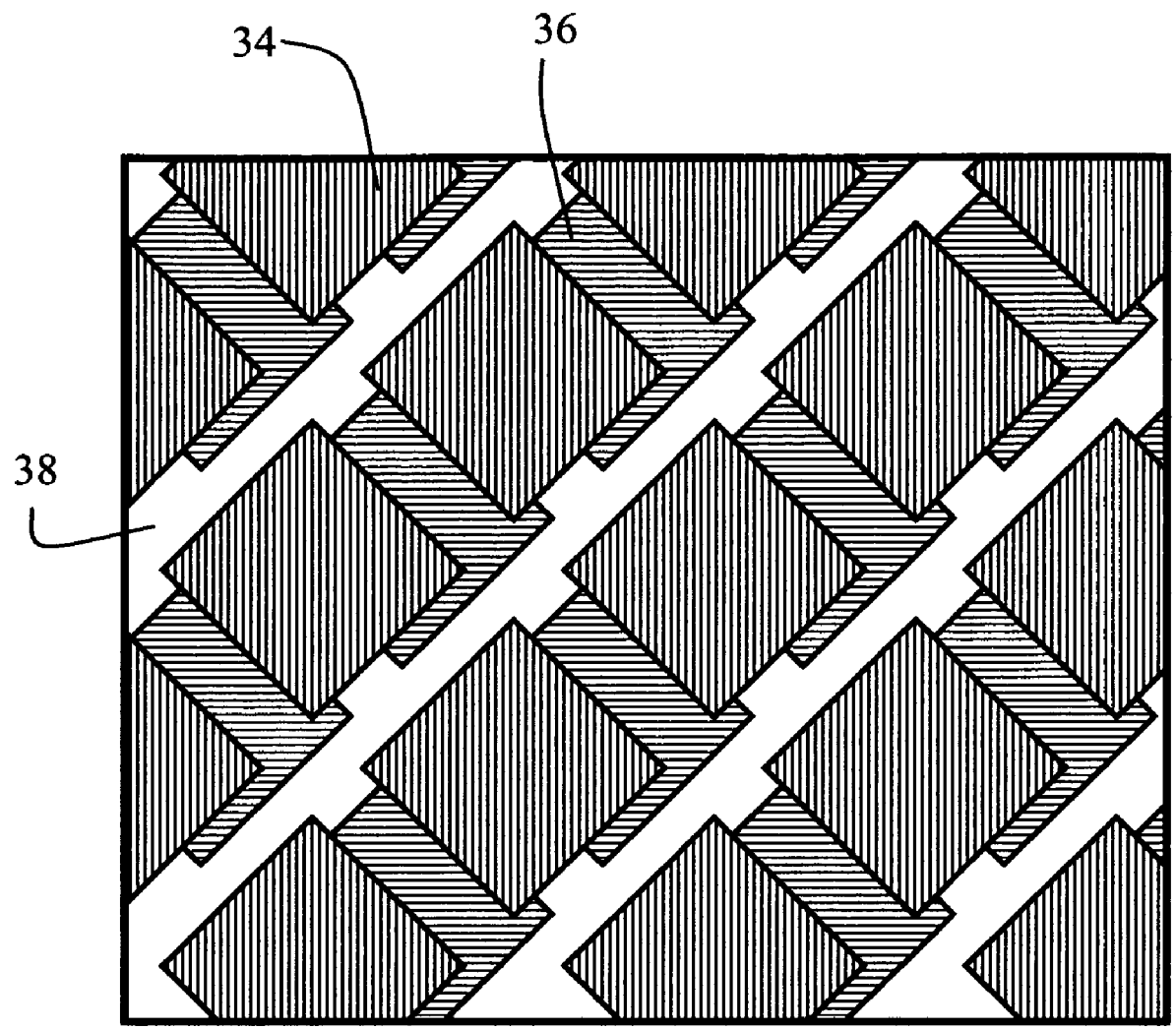
FIG. 8 is a schematic representation of a side view of a glass panel of the present invention having two patterns.

FIG. 8 is a schematic representation of a view of one side of a laminated glass panel corresponding to one having the layer configuration shown in FIG. 3, as viewed from the side of the glass panel in FIG. 3 adjacent the sixth layer 24 (that is, to the right of the sixth layer 24). For the purposes of this illustration, the glass layers, poly(vinyl butyral) layers, and the portions of the polyethylene terephthalate layers lacking a pattern are shown as transparent, although each of those layers can optionally comprise a pigment or agent that functions to color and alter the light transmission qualities of those layers.

As shown in FIG. 8, a square pattern 34 formed on the layer of polyethylene terephthalate (corresponding to the first layer 12 in FIG. 3) closest to the viewer appears to occlude the square patter 36 on the layer of polyethylene terephthalate (corresponding to the third layer 16 in FIG. 3) furthest from the viewer, and the two patterns 34, 36, which are identical patterns, are non-aligned relative to one another to give a final appearance that is a combination of the two.

As is clear from the schematic representation shown in FIG. 8, the two pattern layer glass panels of the present invention provide a finished product that is effective at reducing the amount of visible light that passes through the product. Of course, the amount of transmitted and reflected light and the pattern that it assumes can be changed easily by changing one or both of the patterns being used or changing the relative orientation of the patterns. For example, it is possible to align the two pattern with each other to accomplish a final laminate that is identical in pattern appearance when viewed from either side of the laminate, or to rotate the layer on which the top pattern 34 is located by 45 degrees prior to assembly of the panel, thereby altering the appearance and light transmission qualities when viewed from either side of the finished panel.

In alternative embodiments of the present invention, a composite interlayer for use in multiple layer glass constructs comprises a single layer of a polymeric support film having a first pattern on one side and a second pattern on the other side. In these embodiments the polymeric support film can be any described elsewhere herein for that layer, and the patterns can be imparted on each side using conventional techniques, as described elsewhere herein. The resulting polymeric support film has two patterns, one on each side of the film, and the patterns can be the same or different, and can be aligned or non-aligned. Because the appearance of light reflected or transmitted through a polymeric support film with a single pattern on one side can differ depending on the orientation of the film within the final glass product, the use of a single layer of film with two patterns, one on each side, can yield a different pattern of transmittance and reflection than a comparable polymeric support film that combines the two patterns into a single pattern that is only printed on one side of the film.

This single layer/two pattern polymeric support film, in various embodiments, can be disposed between two layers of adhesive polymer layers, as described elsewhere herein, one or both of which can have agents that impart a color on that layer. The resulting three layer composite interlayer can be used in multiple layer glass panels and other glass applications to provide a novel pattern and composition of reflected and transmitted light. Further layers, as described elsewhere herein, can be added to the three layer embodiment described above to yield numerous further embodiments.

Variations of the two adhesive polymer layers and the polymeric support film are possible, including coloring agents and other agents, as described elsewhere herein for equivalent layers in other embodiments.

Agents that absorb light in the visible spectrum can be added to the various layers to produce colored patterns in the finished product. For example, a laminated structure with patterns such as those shown in FIG. 8 could have the following layer setup, starting from a glass layer on top that is closest to the viewer: transparent glass//poly(vinyl butyral) with a light absorbing agent that makes the layer blue//polyethylene terephthalate with pattern 34 printed in white//clear poly(vinyl butyral)//polyethylene terephthalate with pattern 36 printed in white//poly(vinyl butyral) with a light absorbing agent that makes the layer yellow//transparent glass. This configuration will lead to an appearance, if viewed, for example, in a window opening, of blue squares for both patterns 34, 36 with a green field 38 around the squares. The opposite side of the glass panel with appear as yellow squares on a green field 38. If the middle layer of poly(vinyl butyral) is modified to include an agent that absorbs light in the visible spectrum, then even more intricate color patterns will emerge when the glass panel is viewed in reflectance and transmittance.

As used herein a "pattern" on or within a layer means any intentional printing on or alteration of the layer that results, when viewing the layer with the pattern disposed in a laminated glass panel between two layers of glass in normal interior lighting, in an obvious, regular variation in the light reflectance and transmission throughout the viewable area of the panel to an individual of normal visual acuity. For example, a pattern, as that term is used herein, does not refer to minor or unintentional variations in a layer that result in differences too small to be noticeable or that result in defects that are visible but not regularly occurring in the layer. For example a pattern can be a logo, symbol, geometric pattern, photograph, alphanumeric characters, or combinations thereof. The pattern may be any color or combination of colors. As used herein, the term "color" includes all colors as well as black and white.

As used herein, to "transmit" light in a pattern means that the layer or panel referred to, will, when subjected to light on one side of the layer or panel, result in the appearance of a pattern on the other side of the layer or panel that is visible to an individual of normal visual acuity, as described above.

In other embodiments of the present invention, additional layers are incorporated into the multiple layer assembly. For example, one or more poly(vinyl butyral) layers can be added between the outer glass layers between any other two layers. This could be desirable, for example. In addition, one or more additional polyethylene terephthalate layers can be incorporated between any two poly(vinyl butyral) layers), and these layers can have additional patterns.

Referring again to FIG. 3, the second layer 14, the fourth layer 20, and the fifth layer 18, as well as any additional layers that have been described herein as comprising poly(vinyl butyral) or having the characteristics of these layers, can comprise any suitable polymer, and can comprise a polymer sheet that is made of any suitable material.

As used herein, an "adhesive sheet" or an "adhesive layer" means any polymer composition formed by any suitable method into a thin layer that is suitable for use as an adhesive interlayer in laminated glass structures.

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, for example poly(vinyl butyral), such as acetates, salts, and alcohols. As used herein, "melt" refers to a mixture of resin with a plasticizer and optionally other additives.

The adhesive sheets of the present invention can comprise any suitable polymer, and, in a preferred embodiment, as exemplified above, the adhesive sheet comprises poly(vinyl butyral). In any of the embodiments of the present invention given herein that comprise poly(vinyl butyral) as the polymeric component of the adhesive sheet, another embodiment is included in which the polymer component consists of or consists essentially of poly(vinyl butyral). In these embodiments, any of the variations in additives disclosed herein can be used with the adhesive sheet having a polymer consisting of or consisting essentially of poly(vinyl butyral).

In one embodiment, the adhesive layer comprises a polymer based on partially acetalized poly(vinyl alcohol)s. In another embodiment, the polymer sheet comprises a polymer selected from the group consisting of poly(vinyl butyral), polyurethane, polyvinyl chloride, poly(ethylene vinyl acetate), combinations thereof, and the like. In one embodiment, the polymer sheet comprises poly(vinyl butyral). In other embodiments, the adhesive sheet comprises plasticized poly(vinyl butyral). In further embodiments the adhesive sheet comprises poly(vinyl butyral) and one or more other polymers. Other polymers having a suitable glass transition temperature can also be used. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful as components in polymer sheets.

For embodiments comprising poly(vinyl butyral), the poly(vinyl butyral) can be produced by known acetalization processes that involve reacting PVOH with butyraldehyde in the presence of an acid catalyst, followed by neutralization of the catalyst, separation, stabilization, and drying of the resin.

In various embodiments, the polymer sheet comprising poly(vinyl butyral) comprises 10 to 35 weight percent (wt. %) hydroxyl groups calculated as PVOH, 13 to 30 wt. % hydroxyl groups calculated as PVOH, or 15 to 22 wt. % hydroxyl groups calculated as PVOH. The polymer sheet can also comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups in a minor amount, e.g., a 2-ethyl hexanal group (see, for example, U.S. Pat. No. 5,137,954).

In various embodiments, the polymer sheet comprises poly(vinyl butyral) having a molecular weight greater than 30,000, 40,000, 50,000, 55,000, 60,000, 65,000, 70,000, 120,000, 250,000, or 350,000 grams per mole (g/mole or Daltons). Small quantities of a dialdehyde or trialdehyde can also be added during the acetalization step to increase molecular weight to greater than 350 Daltons (see, for example, U.S. Pat. Nos. 4,874,814; 4,814,529; and 4,654,179). As used herein, the term "molecular weight" means the weight average molecular weight. Any suitable method can be used to produce the polymer sheets of the present invention. Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science &Technology, $3^{rd}$ edition, Volume 8, pages 381–399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

In various embodiments of polymer sheets of the present invention, the polymer sheets can comprise 20 to 60, 25 to 60, 20 to 80, or 10 to 70 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

The amount of plasticizer can be adjusted to affect the glass transition temperature ($T_g$) of the poly(vinyl butyral) sheet. In general, higher amounts of plasticizer are added to decrease the $T_g$. poly(vinyl butyral) polymer sheets of the present invention can have a $T_g$ of 40° C. or less, 35° C. or less, 30° C. or less, 25° C. or less, 20° C or less, and 15° C. or less.

Any suitable plasticizers can be added to the polymer resins of the present invention in order to form the polymer sheets. Plasticizers used in the polymer sheets of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779. and $C_6$ to $C_8$ adipate esters, such as hexyl adipate.

Adhesion control agents can also be include in the polymer sheets of the present invention to impart the desired adhesiveness. For example, any of the ACAs disclosed in U.S. Pat. No. 5,728,472 can be used. Additionally, residual sodium acetate and/or potassium acetate can be adjusted by varying the amount used in acid neutralization. In various embodiments, polymer sheets of the present invention comprise, in addition to sodium acetate, magnesium bis(2-ethyl butyrate)(chemical abstracts number 79992-76-0). The magnesium salt can be included in an amount effective to control adhesion of the polymer sheet to glass.

Additives may be incorporated into the polymer sheet to enhance its performance in a final product. Such additives include, but are not limited to, plasticizers, dyes, pigments, stabilizers (e.g., ultraviolet stabilizers), antioxidants, flame retardants, IR absorbers, combinations of the foregoing additives, and the like, as are known in the art.

Agents that selectively absorb light in the visible spectrum can be added to any of the appropriate polymer layers. Any agents that have such effect that are known in the art can be used.

The poly(vinyl butyral) polymer and plasticizer additives can be thermally processed and configured into sheet form according to methods known to those of ordinary skill in the art. One exemplary method of forming a poly(vinyl butyral) sheet comprises extruding molten poly(vinyl butyral) comprising resin, plasticizer, and additives (hereinafter "melt") by forcing the melt through a sheet die (for example, a die having an opening that is substantially greater in one dimension than in a perpendicular dimension). Another exemplary method of forming a poly(vinyl butyral) sheet comprises casting a melt from a die onto a roller, solidifying the resin, and subsequently removing the solidified resin as a sheet. In either embodiment, the surface texture at either or both sides of the sheet may be controlled by adjusting the surfaces of the die opening or by providing texture at the roller surface. Other techniques for controlling the sheet texture include varying parameters of the materials (for example, the water content of the resin and/or the plasticizer, the melt temperature, molecular weight distribution of the poly(vinyl butyral), or combinations of the foregoing parameters). Furthermore, the sheet can be configured to include spaced projections that define a temporary surface irregularity to facilitate the de-airing of the sheet during lamination processes after which the elevated temperatures and pressures of the laminating process cause the projections to melt into the sheet, thereby resulting in a smooth finish. In various embodiments, the polymer sheets can have thicknesses of 0.1 to 2.5 millimeters, 0.2 to 2.0 millimeters, 0.25 to 1.75 millimeters, and 0.3 to 1.5 millimeters (mm).

Referring again to FIG. 3, the first layer 12 and the third layer 16, as well as any additional layers of this type, can comprise any suitable material that is compatible with the other layers and onto or into which a pattern can be disposed. In various embodiments the layer comprises, consists of, or essentially consists of polyethylene terephthalate. In various embodiments the layer comprises, consists of, or essentially consists of polyethylene napthalate.

The manufacture of and the resulting characteristics of polyethylene terephthalate are well known in the art, and can be purchased, for example, as a film product produced by 3M (St. Paul, Minn.) or CPFilms (Martinsville, Va.). In addition to any pattern, the polyethylene terephthalate layers can optionally comprise a copper grid, an NIR absorbing layer, or any other material or agent that is known in the art and is printed on, dispersed on, or otherwise used in conjunction with polyethylene terephthalate or an equivalent material.

A pattern can be incorporated onto any polyethylene terephthalate or equivalent layer through any known means. In one embodiment, a polyethylene terephthalate layer is coated in the desired pattern with an agent that adheres to the polyethylene terephthalate. Because the polyethylene terephthalate layer is usually transparent, the pattern will be visible from both sides of the layer. Other methods of providing a pattern on or within a layer of polyethylene terephthalate include sputter coating with metal screen printing, rotogravure printing, inkjet printing, thermal transfer printing, and the like.

The material or agent used to create the pattern can itself have any desirable properties. For example, the agent can be white or any suitable color, or can be black, thereby negating visible reflectance while still permitting transmittance of a pattern through the finished product. Additionally, the agent can block the transmission of visible light entirely, or can permit any amount through that still results in a pattern being seen.

The present invention also includes a method of altering the light transmission between two areas, comprising: providing a glass panel of the present invention between said two areas, and, transmitting light through said glass panel.

Further, the present invention includes a laminated safety glass panel comprising any of the multiple layered layouts disclosed herein. The layers of polymer can be disposed between two layers of glass, typically comprising silicon dioxide. Further included is a laminated safety glass comprising sheets of glass with any of the multiple polymer layer layouts described herein.

The present invention also includes windshields, windows, and other finished glass products comprising the glass panels of the present invention.

The interlayer composite of the present invention will most commonly be disposed between sheets of glass, preferably a pair of matching float glass sheets. The glass sheets can be any combination of any types of glass, including both clear glass and tinted glass, and including annealed, heat strengthened or tempered glass. The composite laminate of the present invention has the advantage that it can be used in the same manner, and can be laminated employing the same equipment, as that employed in forming conventional safety glass laminates, for example, processes used to form a safety glass laminate containing a single layer of plasticized poly(vinyl butyral) safety film.

The clarity of a polymer sheet, and particularly a poly(vinyl butyral) sheet, can be determined by measuring the haze value, which is a quantification of light not transmitted through the sheet. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

The "yellowness index" of a polymer sheet can be measured according to the following: Transparent molded disks of polymer sheet 1 cm thick, having smooth polymeric surfaces which are essentially plane and parallel, are formed. The index is measured according to ASTM method D 1925, "Standard Test Method for Yellowness Index of Plastics" from spectrophotometric light transmittance in the visible spectrum. Values are corrected to 1 cm thickness using measured specimen thickness.

Pummel adhesion can be measured according to the following technique, and where "pummel" is referred to herein to quantify adhesion of a polymer sheet to glass, the following technique is used to determine pummel. Two-ply glass laminate samples are prepared with standard autoclave lamination conditions. The laminates are cooled to about −17° C. (0° F.) and manually pummeled with a hammer to break the glass. All broken glass that is not adhered to the poly(vinyl butyral) sheet is then removed, and the amount of glass left adhered to the poly(vinyl butyral) sheet is visually compared with a set of standards. The standards correspond to a scale in which varying degrees of glass remain adhered to the poly(vinyl butyral) sheet. In particular, at a pummel standard of zero, no glass is left adhered to the poly(vinyl butyral) sheet. At a pummel standard of 10, 100% of the glass remains adhered to the poly(vinyl butyral) sheet. Poly(vinyl butyral) layers of the present invention can have, for example, a pummel value of between 3 and 10.

By virtue of the present invention, it is now possible to provide multiple layer glass panels, or laminated panels, having improved light transmission and reflectance qualities, thereby allowing the safe use of such panels in, for example, architectural applications requiring glass panels that transmit light in a pattern.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeable with any ranges, values, or characteristics given for any of the other components of the invention, where compatible, to form an embodiment having defined values for each of the components, as given herein throughout. For example, a polymer sheet can be formed comprising sodium acetate in any of the ranges given in addition to any of the ranges given for plasticizer, to form many permutations that are within the scope of the present invention.

Any figure reference numbers given within the abstract or any claims are for illustrative purposes only and should not be construed to limit the claimed invention to any one particular embodiment shown in any figure.

Each reference, including journal articles, patents, applications, and books, referred to herein is hereby incorporated by reference in its entirety.

The invention claimed is:

1. An interlayer composite, comprising:
a first polymeric support film layer having a first pattern printed thereon;
a first adhesive polymer layer; and,
a second polymeric support film layer having a second pattern printed thereon, wherein said first adhesive polymer layer is disposed between and in contact with said first polymeric support film layer and said second polymeric support film layer, and wherein said first polymeric support film and said second polymeric support film comprise polyethylene terephthalate.

2. The interlayer composite of claim 1, wherein said first adhesive polymer layer comprises poly(vinyl butyral).

3. The interlayer composite of claim 1, further comprising a second adhesive polymer layer disposed in contact with said first polymeric support film and a third adhesive polymer layer disposed in contact with said second polymeric support layer.

4. The interlayer composite of claim 3, wherein said second adhesive polymer layer and said third adhesive polymer layer each comprise poly(vinyl butyral).

5. The interlayer composite of claim 3, wherein either of said second adhesive polymer layer and said third adhesive polymer layer comprises one or more coloring agents.

6. An interlayer composite, comprising:
a first polymeric support film layer having a first pattern printed thereon;
a first adhesive polymer layer; and,
a second polymeric support film layer having a second pattern printed thereon, wherein said first adhesive polymer layer is disposed between and in contact with said first polymeric support film layer and said second polymeric support film layer, and wherein said first adhesive polymer layer comprises poly(vinyl butyral).

7. The interlayer composite of claim 6, wherein said first pattern and said second pattern are the same.

8. The interlayer composite of claim 6, wherein said first pattern and said second pattern are non-aligned.

9. The interlayer composite of claim 6, wherein said first pattern and said second pattern are different.

10. The interlayer composite of claim 6, wherein said first polymeric support film and said second polymeric support film comprise polyethylene terephthalate.

11. The interlayer composite of claim 6, further comprising a second adhesive polymer layer disposed in contact with said first polymeric support film and a third adhesive polymer layer disposed in contact with said second polymeric support layer.

12. The interlayer composite of claim 11, wherein said second adhesive polymer layer and said third adhesive polymer layer each comprise poly(vinyl butyral).

13. An interlayer composite, comprising:
a first polymeric support film layer having a first pattern printed thereon;
a first adhesive polymer layer;
a second polymeric support film layer having a second pattern printed thereon, wherein said first adhesive polymer layer is disposed between and in contact with said first polymeric support film layer and said second polymeric support film layer; and,
a second adhesive polymer layer disposed in contact with said first polymeric support film and a third adhesive polymer layer disposed in contact with said second polymeric support layer.

14. The interlayer composite of claim 13, wherein said second adhesive polymer layer and said third adhesive polymer layer each comprise poly(vinly butyral).

15. The interlayer composite of claim 14, wherein either of said second adhesive polymer layer and said third adhesive polymer layer comprises one or more coloring agents.

16. The interlayer composite of claim 14, wherein both of said second adhesive polymer layer and said third adhesive polymer layer comprise one or more coloring agents.

17. The interlayer composite of claim 13, wherein said first polymeric support film and said second polymeric support film comprise polyethylene terephthalate.

18. The interlayer composite of claim 13, wherein said first adhesive polymer layer comprises poly(vinyl butyral).

19. A multiple layer glass panel, comprising:
a first layer comprising polyethylene terephthalate, wherein said first layer transmits visible light in a pattern;
a second layer comprising poly(vinyl butyral), wherein said second layer is disposed in contact with said first layer; and,
a third layer comprising polyethylene terephthalate, wherein said third layer transmits visible light in a pattern and is disposed in contact with said second layer.

20. The glass panel of claim 19, further comprising a fourth layer comprising poly(vinyl butyral), wherein said fourth layer is disposed in contact with said first layer.

21. The glass panel of claim 20, further comprising a fifth layer comprising poly(vinyl butyral), wherein said fifth layer is disposed in contact with said third layer.

22. The glass panel of claim 21, further comprising a sixth layer of glass, wherein said sixth layer is disposed in contact with said fourth layer.

23. The glass panel of claim 21, further comprising a seventh layer of glass, wherein said seventh layer is disposed in contact with said fifth layer.

24. The glass panel of claim 21, wherein said fourth layer comprises an agent that selectively absorbs light in the visible spectrum.

25. The glass panel of claim 21, wherein said fifth layer comprises an agent that selectively absorbs light in the visible spectrum.

26. The glass panel of claim 21, wherein said third layer comprises an agent that selectively absorbs light in the visible spectrum.

27. The glass panel of claim 21, wherein said fourth layer comprises an agent that selectively absorbs light in the visible spectrum and said fifth layer comprises an agent that selectively absorbs light in the visible spectrum.

28. The glass panel of claim 27, wherein said agent in said fourth layer and said agent in said fifth layer are different.

29. The glass panel of claim 19, wherein said pattern of said first layer and said pattern of said third layer are the same pattern.

30. The glass panel of claim 19, wherein said pattern of said first layer and said pattern of said third layer are different patterns.

31. The glass panel of claim 19, wherein said first layer comprises a layer of polyethylene terephthalate having a coating of pigment deposited on one side, wherein said pigment is distributed on said layer of polyethylene terephthalate in said pattern.

32. The glass panel of claim 19, wherein said third layer comprises a layer of polyethylene terephthalate having a coating of pigment deposited on one side, wherein said pigment is distributed on said layer of polyethylene terephthalate in said pattern.

33. A method of altering the light transmission between two areas, comprising:
providing a multiple layer glass panel between said two areas, wherein said glass panel comprises: a first layer comprising polyethylene terephthalate, wherein said first layer transmits visible light in a pattern; a second layer comprising poly(vinyl butyral), wherein said second layer is disposed in contact with said first layer; and, a third layer comprising polyethylene terephthalate, wherein said third layer transmits visible light in a pattern and is disposed in contact with said second layer; and,
transmitting light through said glass panel.

34. The method of claim 33, wherein said glass panel further comprises a fourth layer comprising poly(vinyl butyral), wherein said fourth layer is disposed in contact with said first layer; a fifth layer comprising poly(vinyl butyral), wherein said fifth layer is disposed in contact with said third layer; a sixth layer of glass, wherein said sixth layer is disposed in contact with said fourth layer; and, a seventh layer of glass, wherein said seventh layer is disposed in contact with said fifth layer.

35. The method of claim 34, wherein said fourth layer comprises an agent that selectively absorbs light in the visible spectrum.

36. The method of claim 34, wherein said fifth layer comprises an agent that selectively absorbs light in the visible spectrum.

37. The method of claim 34, wherein said third layer comprises an agent that selectively absorbs light in the visible spectrum.

38. A multiple layer glass panel, comprising:
a first layer comprising polyethylene terephthalate, wherein said first layer transmits visible light in a pattern;
a second layer comprising poly(vinyl butyral), wherein said second layer is disposed in contact with said first layer;
a third layer comprising polyethylene terephthalate, wherein said third layer transmits visible light in a pattern and is disposed in contact with said second layer;
a fourth layer comprising poly(vinyl butyral), wherein said fourth layer is disposed in contact with said first layer;
a fifth layer comprising poly(vinyl butyral), wherein said fifth layer is disposed in contact with said third layer;
a sixth layer of glass, wherein said sixth layer is disposed in contact with said fourth layer; and,
a seventh layer of glass, wherein said seventh layer is disposed in contact with said fifth layer.

39. An interlayer composite, comprising:
a first polymeric support film layer having a first pattern printed thereon;
a first adhesive polymer layer having a thickness of 0.1 millimeters to 2.14 millimeters; and,
a second polymeric support film layer having a second pattern printed thereon, wherein said first adhesive polymer layer is disposed between and in contact with said first polymeric support film layer and said second polymeric support film layer.

40. The interlayer composite of claim 39, wherein said first polymeric support film and said second polymeric support film comprise polyethylene terephthalate.

41. The interlayer composite of claim 39, wherein said first adhesive polymer layer comprises poly(vinyl butyral).

42. The interlayer composite of claim 39, further comprising a second adhesive polymer layer disposed in contact with said first polymeric support film and a third adhesive polymer layer disposed in contact with said second polymeric support layer.

43. The interlayer composite of claim 42, wherein said second adhesive polymer layer and said third adhesive polymer layer each comprises poly(vinyl butyral).

44. The interlayer composite of claim 43, wherein either of said second adhesive polymer layer and said third adhesive polymer layer comprises one or more coloring agents.

45. The interlayer composite of claim 43, wherein both of said second adhesive polymer layer and said third adhesive polymer layer comprise one or more coloring agents.

46. The interlayer composite of claim 39, wherein said first pattern and said second pattern are the same.

47. The interlayer composite of claim 39, wherein said first pattern and said second pattern are non-aligned.

48. The interlayer composite of claim 39, wherein said first pattern and said second pattern are different.

* * * * *

UNITED STATES PATENT AND TRADEMARK OFFICE
CERTIFICATE OF CORRECTION

| | |
|---|---|
| PATENT NO. | : 7,135,217 B2 |
| APPLICATION NO. | : 10/753485 |
| DATED | : November 14, 2006 |
| INVENTOR(S) | : Angela Marie Lansberry |

It is certified that error appears in the above-identified patent and that said Letters Patent is hereby corrected as shown below:

Delete the number "2.14" in line 31 of column 14 in claim 39 and substitute in its place the number --2.5--.

Signed and Sealed this

Ninth Day of January, 2007

JON W. DUDAS
*Director of the United States Patent and Trademark Office*